No. 841,717. PATENTED JAN. 22, 1907.
M. E. RICKMAN.
FRUIT SEEDER AND STRAINER.
APPLICATION FILED JULY 15, 1905.
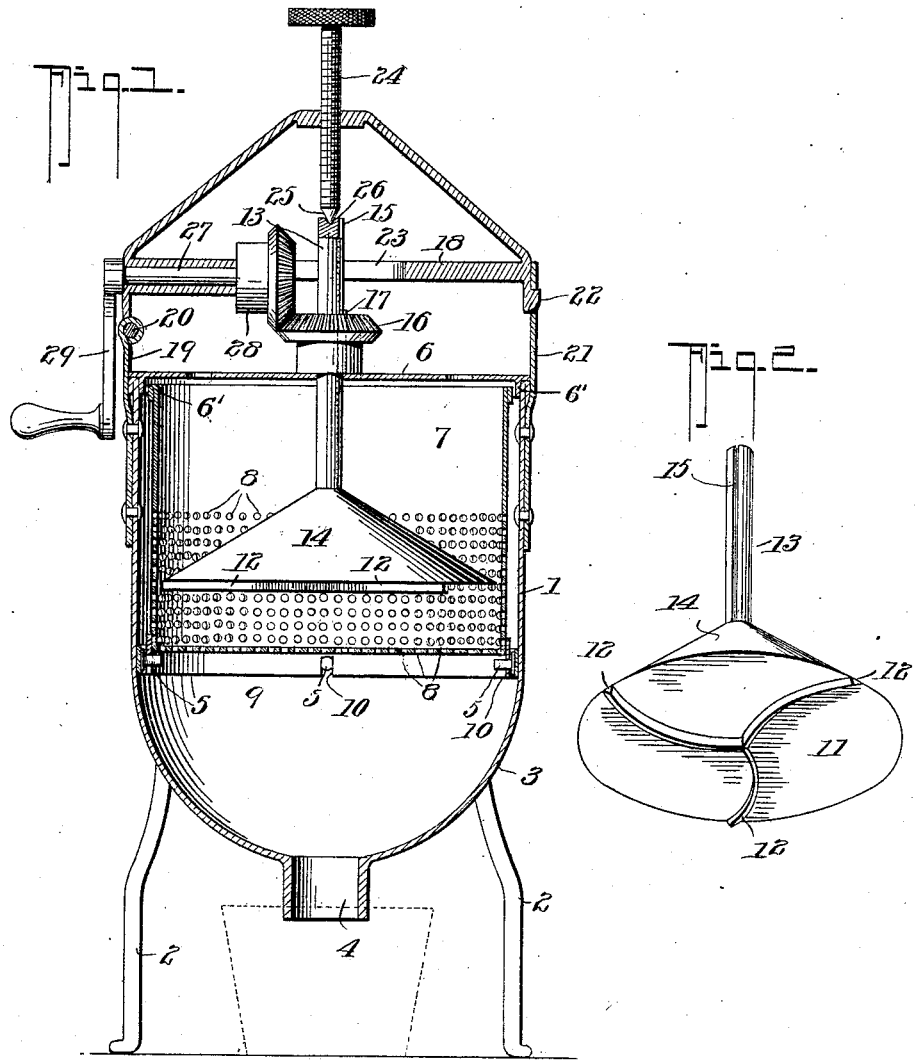
Witnesses
Mary E. Rickman,
Inventor,
by C. A. Snow & Co.
Attorneys

UNITED STATES PATENT OFFICE.

MARY E. RICKMAN, OF WAVERLY, KANSAS, ASSIGNOR OF ONE-HALF TO ELIZABETH SPONSELLER, OF EMPORIA, KANSAS.

FRUIT SEEDER AND STRAINER.

No. 841,717.

Specification of Letters Patent.

Patented Jan. 22, 1907.

Application filed July 15, 1905. Serial No. 269,827.

*To all whom it may concern:*

Be it known that I, MARY E. RICKMAN, a citizen of the United States, residing at Waverly, in the county of Coffey and State of Kansas, have invented a new and useful Fruit Seeder and Strainer, of which the following is a specification.

My invention relates to fruit strainers and seeders, and has for its object to provide a device of the class for straining and pressing the juice and pulp from the skins and seeds of fruit with the expenditure of minimum labor.

With the above and other objects in view, as will appear as the nature of the invention is better understood, the same consists in the novel construction and combination of parts of a fruit strainer and seeder, as will be hereinafter fully described and claimed.

In the drawings, Figure 1 is a vertical sectional view of the improved fruit strainer and seeder. Fig. 2 is a perspective view of the follower of the improved fruit-strainer, showing the inclined surfaces outstanding from the work-engaging face.

Like characters of reference designate corresponding parts throughout both views.

In its preferred embodiment the improved fruit strainer and seeder comprises a cylindrical casing 1, mounted in any approved manner, as upon the legs 2, and provided at its lower end with a semispherical portion 3, terminating in the discharge-spout 4. Internally the casing 1 is provided with lugs 5, rigidly secured to the casing adjacent the line of union of the portion 1 with the portion 3. The casing is provided with a lid or cover 6, having a flange 6' fitting within the upper end of the casing 1.

Within the casing 1 is disposed a material-receiving receptacle 7, provided through its bottom and a portion of its side walls with perforations 8. The upper end of the receptacle 7 is spaced from the casing 1 by the flange 6' of the lid 6, which enters between the upper edges of said casing and the receptacle 7. Externally the receptacle 7 is provided with an annular flange 9, extending downward below the perforated bottom, and notches 10 are formed in the flange to be engaged by the lugs 5. It will be noted by reference to Fig. 1 that the flange 9 operates to hold the receptacle 7 spaced from the inner walls of the casing 1, thereby providing a space for the juice pressed from the fruit to escape to the portion 3. It will also be observed that the notches 10 are open-ended, and this will permit the ready disconnection of the receptacle 7 from the lugs 5 when the former is to be lifted from the casing for the purpose of cleansing or otherwise.

Within the perforated receptacle is mounted a follower having a plane circular work-engaging face 11, provided with arcuate ribs 12, radiating from a central point and having beveled or inclined edges. The follower is rigidly mounted upon a shaft 13 by means of a conical bracing member 14. The shaft 13 extends upwardly through a central aperture formed for the purpose in closure 6 and is provided with a longitudinally-extending keyway 15. Upon the shaft is mounted a bevel gear-wheel 16, having a lug 17, arranged to engage within the keyway 15 and to permit a free longitudinal movement of the shaft 13 within the gear 16, but to prevent a rotary movement of either relative to the other.

A frame 18 is mounted upon the upper end of the casing 1 in any approved manner, as by pivoting to the ear 19 by the pivot-pin 20. Means is provided for retaining the frame 18 in operative position, as the spring-ear 21, secured to the casing and engaging the lug 22 of the frame. The frame 18 is provided with an opening 23, through which the shaft 13 may extend, and carries a screw 24, having a bearing-point 25, engaging with the cavity 26, formed in the end of shaft 13.

Upon the frame 18 is journaled a shaft 27, and to which is rigidly secured the bevel-gear 28, disposed for operative engagement with the bevel-gear 16. The shaft 27 is provided with any approved means for applying power, as the crank 29.

The operation of my improved fruit strainer and seeder is as follows: The perforated receptacle is disposed within the casing and filled to the approved height with the material to be operated upon. The follower is placed within the receptacle upon the material and the cover 6 put in place by passing over the shaft 13. The bevel-gear 16 is slidably placed upon the shaft 13 with the lug 17 within the keyway 15 and the frame 18 turned down to operative position, as shown in Fig. 1, bringing the gear 28 into engagement with gear 16. The screw 24 is then regulated so that the point 25 engages within the cavity 26 and a desired amount of pressure exerted. The crank 29 is then rotated, which through the medium of gears 28 and 16 rotates the follower. The ribs 12 in their rotation force the material downward, and as the follower is rotated the screw 24 is tightened, forcing the juice, pulp, and soft material out through the perforations 8 into the portion 3, by which it is conducted to a vessel through the spout 4.

Having thus described the invention, what is claimed is—

A seeder and strainer comprising a casing provided with interior lugs and a discharge-opening, a closure for the casing, a perforated receptacle removably disposed within the casing and having notches which receive said lugs, a cover for said receptacle, a shaft horizontally journaled in the casing-closure, a gear-wheel fixed to said shaft, a shaft passing vertically through the center of the receptacle-cover and adapted to rotate and move longitudinally therein, a gear-wheel supported by the receptacle-cover and receiving said vertical shaft and adapted to rotate with the same, said shaft being capable of endwise movement through the last of said gear-wheels, said gear-wheels meshing with each other and a screw threaded in the center of the casing-closure and bearing at its lower end upon the upper ends of said vertical shafts.

In testimony that I claim the foregoing as my own I have hereto affixed my signature in the presence of two witnesses.

MARY E. RICKMAN

Witnesses:
J. E. O'NEIL,
ED C. BARR.